United States Patent [19]

Hofer

[11] 4,034,137
[45] July 5, 1977

[54] COMPOSITE SHEET STRUCTURE AND METHOD FOR MANUFACTURING SAME

[75] Inventor: Peter H. Hofer, Grosse Pointe Farms, Mich.

[73] Assignee: John Z. Delorean Corporation, Bloomfield Hills, Mich.

[22] Filed: Dec. 6, 1976

[21] Appl. No.: 748,039

[52] U.S. Cl. .................. 428/308; 156/295; 264/258; 264/321; 428/311; 428/313; 428/315; 428/317

[51] Int. Cl.² .................................. B32B 3/26

[58] Field of Search ......... 428/306, 308, 310, 311, 428/317, 315, 313, 314, 320, 321, 322; 264/257, 258, 321; 156/295

[56] References Cited

UNITED STATES PATENTS

| 3,515,625 | 6/1970 | Sedlak et al. | 428/315 |
|---|---|---|---|
| 3,535,198 | 10/1970 | Bloom | 428/315 |
| 3,707,434 | 12/1972 | Stayner | 428/313 |
| 3,864,206 | 2/1975 | Linderoth | 428/159 |
| 3,900,650 | 8/1975 | Sedore | 428/310 |
| 3,944,704 | 3/1976 | Dirks | 428/311 |
| 3,989,781 | 11/1976 | Chant | 428/311 |

Primary Examiner—William J. Van Balen
Attorney, Agent, or Firm—Reising, Ethington, Barnard, Perry & Brooks

[57] ABSTRACT

The subject matter of the invention is a composite sheet structure having at least two layers of initially liquid-permeable material at least one of which layers is an initially resilient material with open and connected cells, and a thermosetting resinous material which impregnates the layers and which has been cured while the layers are maintained under compression, there being fibrils having a length not in excess of about 1/16 inch in the resinous material, the fibrils preferably being more numerous adjacent the interface of the two layers than in the portions thereof spaced from the interface. Further in accordance with the invention, such a composite sheet is preferably manufactured by applying a mixture of the resinous material, in liquid form, and the fibrils between the two layers and then compressing the two layers and heating them to the curing temperature of the resinous material whereby the liquid resinous material is driven through the two layers and then cured and whereby the concentration of the fibrils in the final cured composite sheet is greater at the interface of the two layers than in the portions spaced from the interface.

26 Claims, 5 Drawing Figures

COMPOSITE SHEET STRUCTURE AND METHOD FOR MANUFACTURING SAME

The present invention relates to a structure and a method for manufacturing a laminated sheet comprising a composite of materials which are bonded together to provide a structure which has high mechanical strength and light weight and which is relatively simple and inexpensive to manufacture. More specifically, the invention relates to a composite formed of open-celled resilient resin foam, thermosetting resin and fibrous materials. One of the principal uses for the composite sheet structure made in accordance with the invention is for automotive vehicle body panels though the composite structures find many other uses such, for example, as for boat hulls, furniture, architectural wall panels and the like.

Particularly as regards automobiles and other automotive vehicles, there has been and continues to be a strenuous effort to accomplish weight reduction in order to increase operating efficiency and hence a reduction in fuel consumption. One of the principal efforts in this connection has been the development of composite organic resin sheet structures to provide light weight, high strength panels which can be of flat or curved construction for use in place of sheet steel for automotive vehicle bodies and body parts. Outstanding for this purpose are the laminated sheet structures comprising resilient open-celled organic resin foam impregnated with a thermosetting resin and compressed and bonded to surface layers of thermosetting resin-impregnated fibrous materials such as fiberglass matted or woven cloth. U.S. Pat. Nos. 3,193,437, 3,192,441, and 3,944,707 disclose laminated sheet structures of this type. One method for manufacturing such sheet structures is to form an assembly of two or more sheets of liquid-permeable material at least one of which is a resilient open-celled organic resin foam, with a layer of liquid thermosetting resin between the opposed inner surfaces of the sheets, and then compressing and heating the assembly to cause the liquid thermosetting resin to permeate through the sheets and to cure the thermosetting resin. The assembly can include only a single sheet of the open-celled organic resin foam or two or more such sheets laid back-to-back, and the assembly generally also includes layers of fibrous material, preferably woven or matted fiberglass cloth over one or both outer surfaces of the foam sheet or combination of foam sheets, the amount of liquid thermosetting resin sandwiched between the sheets being sufficient that the thermosetting resin not only permeates through and impregnates the foam sheet or sheets but also permeates through and impregnates the fibrous sheet or sheets to the end that the final cured composite sheet has relatively smooth outer surfaces with a backing of the impregnated organic resin foam the cells of which are at least partially collapsed and at least partially filled with the thermosetting resin.

The difficulty which has been encountered with such composites, particularly when more than one organic resin foam sheet is used, is that the central area, as distinguished from the edge portions, of the foam sheet or sheets tend to expand in thickness toward their uncompressed state after the heating and pressing step thereby resulting in a pillow-like structure which is useless and constitutes scrap. Because of this problem the thickness of the assembly after the pressing and heating step has generally had to be limited to about 3 millimeters or less. This is a serious limitation because stiffness, which is desirable, is a function of thickness — the greater the thickness, the greater the stiffness of the composite sheet. Further, even where the thickness of the final cured sheet has been 3 millimeters or less, the heat and pressure have had to be exerted for an excessively long period in order to assure against pillowing. Hence, the problem not only places severe limitations on the thickness, and hence the stiffness, of the composite sheets which can be made but also extends the processing time required for manufacture thereby reducing production rates and increasing production costs. Still further, irrespective of whether only one or a pair of foam sheets are used and irrespective of whether the thickness of the composite sheet is greater or less than 3 millimeters, another problem, particularly where a polyester type liquid thermosetting resin is used, has been the relative weakness of the bond between the surfaces of the fibrous sheets and the surfaces of the foam sheets. That is, when a sufficient bending force is applied to such a composite sheet to cause a failure, the failure is almost invariably in the bond between the fibrous sheet and the foam sheet. That is, the fibrous sheet separates from the foam sheet in the localized area where the bending has occurred.

Briefly, what I have discovered is that the pillowing problem can be eliminated and the strength of the sheet against failure due to bending forces can be greatly increased by including in the liquid thermosetting resin fibrils, preferably glass fibrils and preferably having a length not exceeding about 1/16 inch, ideally having a length of about 1/64 inch. Still further improvements can be accomplished by also including in the liquid thermosetting resin hollow glass beads, i.e. bubbles, having a diameter less than the length of the fibrils and preferably having a diameter of from about 10 to 200 microns and with a wall thickness of from about 0.5 to 0.2 microns. In all cases it is preferable that the fibrils have a length greater than the mean diameter of the foam cells, when the foam is in its uncompressed state, and that the glass beads have a diameter less than the mean diameter of the foam cells. When such preferred embodiments are used, during the compression step only a minor portion of the fibrils migrate more than a short distance into the liquid-permeable sheets and hence in the final cured structure the concentration of fibrils adjacent the interface between the sheets is greater than the concentration of fibrils which have migrated to adjacent the outer surfaces of the sheets. However, where the hollow glass beads are also included, as is preferred, the beads migrate further into the sheets because of the smaller size and spherical shape of the beads and hence, in the final cured structure, there is a gradation of the concentration of the fibrils and the beads from the interface of the two sheets to the portions thereof spaced from the interface, the gradation of the fibrils being greater than the gradation of the beads because of the larger size and elongated shape of the fibrils. This gradation is enhanced by the pressure which is applied and which progressively collapses the cells of the foam. That is, early in the compression and heating step the amount of migration is relatively great but as the compression continues the foam cells become progressively smaller thereby diminishing the rate of migration. Likewise, where one of the sheets is of fibrous material such as matted fiberglass cloth, as compression continues the interstices or paths available for migration progressively become smaller thereby diminishing migration. Hence, during compression the sheet assembly becomes a variable classifier and the fibrils and beads are trapped at different levels within the assembly. When the resin polymerizes to hardness during curing the fibrils and beads form a reinforcing network which significantly increases the mechanical strength of the final cured laminated sheet. But further, and more importantly, the fibrils in particular strengthen the bond at the interface and inhibit the expansion of the sheets after cessation of the applied pressure thereby solving the pillowing problem. Hence, by employing the invention laminated composite sheets of the type described can be efficiently made to thicknesses well in excess of 3 millimeters and, irrespective of the thickness of the sheets, the pressing and curing step in the manufacture of the sheets can be relatively short thereby increasing production rates and hence production costs without hazard of pillowing of the sheets. Still further, the ability of the resulting composite sheets to withstand failure from impact or other bending forces applied to the sheet is substantially increased. The fact is that by inclusion of the fibrils, and preferably a combination of the fibrils and hollow glass beads, in the thermosetting resin used to impregnate the foam sheets, the heretofore problem of pillowing of the composite sheet after the pressing and heating step can be eliminated and the strength of the composite sheet increased.

Other features and advantages of the invention will appear more clearly from the following detailed description thereof made with reference to the accompanying drawings in which.

DETAILED DESCRIPTION OF THE PREFERRED EMBODIMENTS

Figure 1:
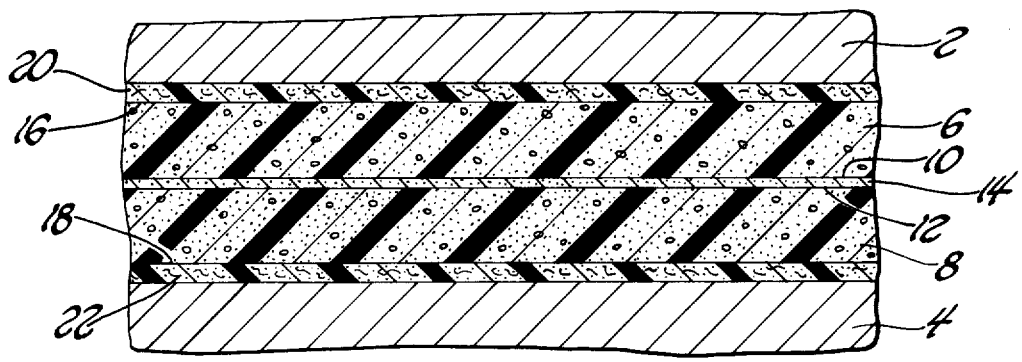
FIG. 1 is a cross-sectional view, and with parts broken away, of a composite structure embodying the invention, the composite structure being shown between the upper and lower heating and pressing molds prior to the heating and pressing step but the cells of the foam not being shown.

Referring now to FIG. 1, the assembly shown between the upper and lower heating and pressing molds, 2 and 4 respectively, comprises two sheets, 6 and 8, of resilient polyurethane foam having open and connected cells. Between and coextensive with the inner opposed surfaces 10 and 12, respectively, of the foam sheets 6 and 8 is a uniform mixture 14 of a liquid thermosetting resin, glass fibrils having a length of about 1/64 inch and hollow glass beads having a diameter of from about 20 to 130 microns. In practice, each of the surfaces 10 and 12 can be coated with the liquid mixture, as by brushing or roller coating, prior to assembling the two sheets 6 and 8 together, the liquid coatings on the surfaces thereupon merging into a single layer of the mixture between the sheets as shown. Because of the cellular structure of the sheets the mixture at least slightly permeates into the sheets even prior to the heating and pressing step as hereinafter described.

Overlaying the outer surfaces 16 and 18, respectively, of the sheets 6 and 8 are matted glass cloth layers 20 and 22, respectively. The amount of the mixture 14 between the polyurethane foam layers 6 and 8 is sufficient to permeate entirely through the layers 6 and 8 and the layers 20 and 22 and fill the cells and interstices thereof upon the application of pressure to the assembly. Hence, the amount of mixture 14 applied between the sheets 6 and 8 will, of course, depend on the thicknesses of these sheets and of the glass cloth layers 20 and 22 after compression.

With the assembly, as shown and described, positioned between the heating and pressing mold parts 2 and 4, the latter are, while in a heated condition, moved toward each other thereupon compressing the assembly and hence compressing the resilient polyurethane foam layers 6 and 8. As this compression progressively occurs the liquid mixture 14 permeates through the open-celled layers 6 and 8 and then through the matted glass cloth layers 20 and 22 and into contact with the heating and curing mold parts 2 and 4. During the early stages of the compression a portion of the glass fibrils migrate further into the cells of the foam sheets but with still further migration of the fibrils being inhibited by reason of the filtering action of the cells as they become progressively collapsed as the compression continues. The hollow glass beads also undergo migration with the liquid thermosetting resin into the open cellular structure of the foam sheets 6 and 8; however, because of the smaller size of the beads and the better flow properties thereof because of their spherical shape, the migration of the beads is less inhibited by the progressively continued collapse of the cells and hence the beads can migrate further through the combined thicknesses of the sheets 6 and 20 and the sheets 8 and 22. After the molds have been moved toward each other to provide a spacing therebetween equal to the thickness desired for the finished, cured composite sheet, the molds are held in this position for sufficient time to cure the thermosetting resin to hardness whereupon the molds are withdrawn and the finished composite sheet removed. The precise hold time for the molds to fully cure the thermosetting resin will, of course, depend on the precise mold temperature being used, the particular thermosetting resin being used and also on the thickness of the assembly and the amount of the thermosetting resin used. However, by reason of the inclusion of the glass fibrils, in particular, and also the glass beads in the thermosetting resin, the hold time required to effect a cure without hazard of subsequent pillowing of the assembly can be shorter than where only the liquid thermosetting resin is used as the impregnant.

The liquid thermosetting resin can be any of those well known in the art for making automobile bodies, boat hulls, furniture and the like, examples of such liquid thermosetting resins being taught in the aforementioned patents and the most commonly used of which are the liquid polyester thermosetting resins and the liquid epoxy thermosetting resins. The amount of glass fibrils included in the mixture should preferably be from about 3 to 15 parts by weight for each hundred parts by weight of the liquid thermosetting resin and where the hollow glass beads are also included in the mixture it is preferred that likewise the amount of beads be about 3 to 15 parts by weight for each 100 parts by weight of the resin. It will be understood, of course, that by way of the filtering action of the cellular structure of the foam sheets and the resulting gradation of the fibrils and beads which occurs in the final cured assembly from the center thereof to the outer surfaces, the concentration of the fibrils in the cured resin adjacent the junction of the two foam sheets will be greater than the concentration of the fibrils included in the liquid mixture whereas at the outer surfaces of the cured composite sheet there will be relatively few, if any, of the fibrils. On the other hand, the gradation of the beads through the thickness of the sheets from the center portion thereof to the outer surfaces will be more gradual, a greater portion of beads having migrated to, or at least close to, the outer surfaces of the foam sheets and even into the glass cloth layers.

Figure 2:
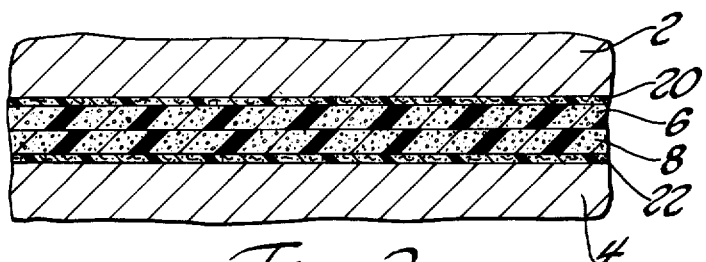
FIG. 2 is a view similar to that of FIG. 1 but showing the composite structure between the heating and pressing molds at the conclusion of the heating and pressing step.

FIG. 2 shows the assembly in its compressed and cured condition between the molds at the conclusion of the heating and pressing step. By reason of the compression, the final assembly has a thickness which is generally less than one-fourth the thickness of the initial uncompressed assembly, the precise ratio of the thicknesses of the compressed and uncompressed assemblies depending, of course, on the size of the cells, and hence the density, of the foam sheets used and also on the precise amount of the mixture 14 used for the impregnation. In the final cured structure the thermoset resin forms a continuous phase disposed throughout the foam and glass cloth layers.

Figure 3:
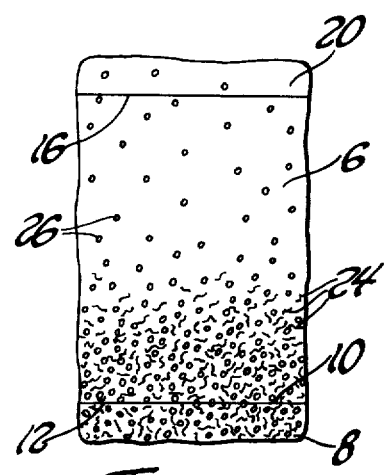
FIG. 3 is an enlarged cross-sectional view of a portion of the composite structure shown in FIG. 2.

FIG. 3 illustrates schematically the gradation in concentration of the fibrils and beads through the thickness of the final cured assembly from the center thereof to the outer surfaces thereof. It will be seen that the concentration of the fibrils 24 is greater near the inner surface 10 of foam sheet 6 at its junction with the inner surface of foam sheet 8, and with the concentration of the fibrils then diminishing in the direction toward the outer surface 16 of the foam sheet 6, there being few if any of the fibrils adjacent the surface 16. On the other hand, the gradation of the hollow glass beads 26 is more gradual, a greater number of the beads having migrated closer to the surface 16 and with some of the beads migrating into the glass cloth layer 20.

It will be understood, of course, that the liquid thermosetting resin additionally contains a polymerization catalyst and can also contain powdered pigments or fillers such, for example, as titania or calcium carbonate preferably having a particle size of less than 10 microns — generally with an average particle size of about 3 microns. Also, mold release agents can, of course, be used, as well known in the art, to prevent sticking of the cured assembly to the pressing and heating molds.

The following specific example will serve to further illustrate the invention.

An assembly was prepared using two sheets of polyurethane foam having open and connected cells, the thickness of each of the foam sheets being about ½ inch and the average cell size being about 0.025 inches — the foam density being about 1.2 pounds per cubic foot. Prior to such assembly the inner opposed surfaces of the foam sheets are coated with a mixture containing the following: 100 parts by weight polyester liquid thermosetting resin, 5 parts by weight glass fibrils having an average length of about 1/64 inch, and 5 parts by weight hollow glass beads or bubbles having an average diameter of about 20 to 130 microns. The amount of such mixture applied to the inner surfaces of the foam sheets was such that with the foam sheets assembled the amount of the mixture between the foam sheets was approximately 364 grams per square foot. Each of the outer surfaces of the assembly of the foam sheets was overlaid with a fiberglass mat having a thickness of about 0.035 inches and a density of about 1.5 ounces per square foot thereof. This assembly was then placed between the upper and lower pressing and heating molds and the molds were moved toward each other until the distance between them was 5 millimeters such that the aforedescribed assembly was compressed to a thickness of 5 millimeters. The molds were at a temperature of 300° F. and the hold time to accomplish full cure of the thermosetting resin was two minutes. The resulting laminated composite sheet had excellent surface characteristics and no pillowing occurred.

When the aforesaid is repeated with all materials and conditions identical except with the liquid thermosetting resin not containing the glass fibrils and hollow glass beads, or with the liquid thermosetting resin containing the hollow glass beads but not containing the glass fibrils, the resulting laminated composite sheet underwent pillowing.

The assembly shown in FIGS. 1–3 wherein two foam sheets are used and the liquid resin mixture is applied only to the inner surfaces of the foam sheets has the desirable feature that after the two foam sheets with the liquid resin mixture therebetween are assembled, the resulting two-sheet assembly has no liquid resin on the outer surfaces and hence is easy to handle. Such an assembly can advantageously be used especially where the liquid resin employed is a polyester since, whereas with polyester the pillowing problem is acute, the problem of separation of the foam sheet from the glass cloth sheet upon application of a bending force to the final composite sheet is not as great as where, for example, epoxy resin is used. Because of the presence of the fibrils at the interface of the foam sheets, the pillowing problem is eliminated. Further, since the foam sheets can be relatively thin in an assembly where two or more foam sheets are used, there can be sufficient migration of the fibrils to the interface between the foam and the glass cloth as to lend added strength to the bond between these layers. It will be understood, however, that if desired a layer of the liquid thermosetting resin mixture (i.e. containing the fibrils and, if desired, also the beads) can be included between the outer surface of the foam sheets and the glass cloth, such being particularly advantageous where epoxy resin is used.

Figure 4:
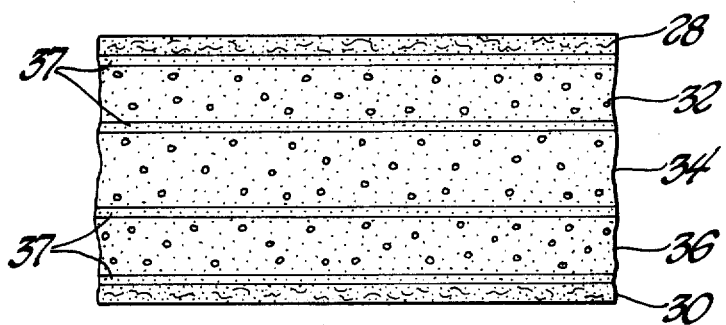
FIG. 4 is a view similar to that of FIG. 1 but showing another embodiment of the invention.

FIG. 4 shows an embodiment of the invention wherein three sheets of the open-celled resin foam are used in the assembly. In FIG. 3, 28 and 30 are glass cloth and 32, 34 and 36 are polyurethane foam sheets having open and connected cells, the middle, relatively thick, foam sheet 34 and each of the relatively thin foam sheets 32 and 36 having both sides thereof coated with a mixture 37 of liquid thermosetting resin, glass fibrils and small hollow glass beads as described aforesaid. It will be understood that after forming the assembly as shown and described, it is compressed and heated as described aforesaid with reference to FIGS. 1–3 to provide the cured composite panel structure.

Figure 5:
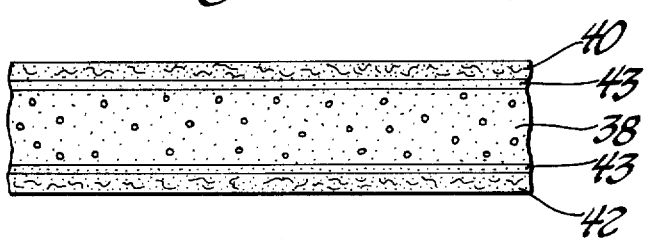
FIG. 5 is a view similar to those of FIGS. 1 and 4 but showing still another embodiment of the invention.

FIG. 5 shows an embodiment of the invention wherein one sheet of open-celled foam and two sheets of fiberglass cloth are used. In FIG. 4, 38 is a sheet of resilient open-celled polyurethane foam, and 40 and 42 are matted fiberglass cloth, both surfaces of the foam sheet 38 being coated with a mixture 43 of liquid thermosetting resin, glass fibrils and hollow glass beads as described aforesaid. Such an assembly is particularly advantageous where epoxy thermosetting resin is used since it provides a high concentration of the fibrils at the interfaces between the foam and the glass cloth which is where epoxy impregnated assemblies have their greatest weakness and hence greatest likelihood of failure when a bending stress is applied.

After the assembly of FIG. 5 is formed it is compressed and heated, as aforesaid, to provide the completed composite panel.

It will be understood that the features described with reference to any one embodiment can be used in combination with features described with reference to another embodiment and that various other changes and modifications can be made. For example, in the embodiment shown in FIGS. 1–4 wherein two or more foam sheets are used, the foam sheets can have the same cell sizes and densities or can have different cell sizes and densities. Also, in any of the embodiments, the composite sheet can be made to a curved or three dimensional rather than a flat configuration as shown. As another example, where it is desired to coat both sides of the foam sheet or sheets with the liquid resin mixture and where the liquid resin used is one which has one having a long pot life, e.g. a polyester resin, the resin can be applied by running the foam sheet through a tank of the liquid resin mixture rather than applying it by spraying, rolling, or brushing. Hence, whereas the invention has been described in its particulars with reference to certain preferred embodiments thereof, various changes and modifications can be made all within the full and intended scope of the claims which follow.

What is claimed is:

1. A composite structure comprising two layers of initially liquid permeable material having opposed inner surfaces and having outer surfaces oriented in opposite directions, at least one of said layers being an initially resilient resin foam with open and connected cells, and a thermosetting resinous material which impregnates said layers and which has been cured while maintaining said layers under compression whereby the resinous material is disposed in said layers and therebetween as a continuous and rigid phase, said thermosetting resinous material containing fibrils having a length not in excess of about 1/16 inch.

2. A composite as set forth in claim 1 wherein said fibrils are more numerous adjacent the inner surfaces of said layers than in portions of said layers spaced from said inner surfaces.

3. A composite as set forth in claim 1 wherein said fibrils have a length of about 1/64 inch to 1/16 inch.

4. A composite as set forth in claim 1 wherein said fibrils are present in an amount of from about 3 to 15 parts by weight for each 100 parts by weight of said resinous material.

5. A composite as set forth in claim 1 wherein said thermosetting resinous material also contains hollow glass beads having a diameter less than the length of said fibrils.

6. A composite as set forth in claim 5 wherein said glass beads are present in an amount of from about 3 to 15 parts by weight for each 100 parts by weight of said resinous material.

7. A composite as set forth in claim 5 wherein said fibrils and said beads are more numerous adjacent said inner surface of said layers than in portions of said layers spaced from said inner surfaces, the gradation in concentration from the inner surfaces to said portions spaced therefrom being greater for said fibrils than for said beads.

8. A composite as set forth in claim 1 wherein both of said layers are of an initially resilient resin foam with open and connected cells.

9. A composite as set forth in claim 8 wherein at least one of said outer surfaces is overlaid with a layer of fibrous material impregnated with said resinous material.

10. A composite as set forth in claim 9 wherein said fibrous material is glass cloth.

11. A composite as set forth in claim 1 wherein one of said layers is of said initially resilient resin foam with open and connected cells and the other of said layers is of fibrous material.

12. A composite as set forth in claim 11 wherein said fibrous material is glass cloth.

13. A composite as set forth in claim 1 wherein said fibrils are glass.

14. A method for making a composite structure comprising the steps of forming an assembly which includes two sheets of liquid permeable material having between the opposed inner surfaces thereof a uniform mixture of liquid thermosetting resin and fibrils having a length not exceeding about 1/16 inch, at least one of said sheets being a resilient resin foam with open and connected cells; and then compressing and heating said assembly to cure said liquid thermosetting resin to permeate through said sheets and to cure said thermosetting resin.

15. A method as set forth in claim 14 wherein the length of said fibrils is greater than the average diameter of the cells of said foam.

16. A method as set forth in claim 14 wherein said fibrils are glass and have a length of about 1/64 inch to 1/16 inch.

17. A method as set forth in claim 14 where said fibrils are present in an amount of from about 3 to 15 parts by weight from each 100 parts by weight of said resinous material.

18. A method as set forth in claim 14 wherein said thermosetting resinous material also contains hollow glass beads having a diameter less than the length of said fibrils.

19. A method as set forth in claim 18 wherein the diameter of said beads is less than the average diameter of the cells of said foam.

20. A method as set forth in claim 18 wherein said glass beads are present in an amount of from about 3 to 15 parts by weight for each 100 parts by weight of said resinous material.

21. A method as set forth in claim 14 wherein both of said layers are of an initially resilient resin foam with open and connected cells.

22. A method as set forth in claim 14 wherein at least one of said outer surfaces is overlaid with a layer of fibrous material.

23. A method as set forth in claim 22 wherein said fibrous material is glass cloth.

24. A method as set forth in claim 14 wherein one of said layers is of said initially resilient resin foam with open and connected cells and the other of said layers is of fibrous material.

25. A method as set forth in claim 24 wherein said fibrous material is glass cloth.

26. A method as set forth in claim 24 wherein said fibrous material is glass cloth of matted construction.

* * * * *